(12) United States Patent
Suze

(10) Patent No.: US 11,639,226 B2
(45) Date of Patent: May 2, 2023

(54) DEVICE FOR UNLOCKING A SYSTEM FOR CLOSING A CONTAINER BY MEANS OF A TIE AND CONTAINER PROVIDED WITH SUCH AN UNLOCKING DEVICE

(71) Applicant: SAFRAN AEROSYSTEMS, Plaisir (FR)

(72) Inventor: Gaël Suze, Plaisir (FR)

(73) Assignee: SAFRAN AEROSYSTEMS, Plaisir (FR)

( * ) Notice: Subject to any disclaimer, the term of this patent is extended or adjusted under 35 U.S.C. 154(b) by 0 days.

(21) Appl. No.: 16/971,843

(22) PCT Filed: Feb. 26, 2019

(86) PCT No.: PCT/EP2019/054712
§ 371 (c)(1),
(2) Date: Aug. 21, 2020

(87) PCT Pub. No.: WO2019/166423
PCT Pub. Date: Sep. 6, 2019

(65) Prior Publication Data
US 2020/0407068 A1    Dec. 31, 2020

(30) Foreign Application Priority Data
Feb. 28, 2018   (FR) ...................... 1851758

(51) Int. Cl.
*B64D 17/52* (2006.01)
*B64D 17/46* (2006.01)
(Continued)

(52) U.S. Cl.
CPC ............ *B64D 17/52* (2013.01); *B64D 17/46* (2013.01); *B64C 2201/185* (2013.01); *B64D 17/386* (2013.01); *B64D 17/64* (2013.01)

(58) Field of Classification Search
CPC ...... B64D 17/52; B64D 17/46; B64D 17/386; B64D 17/64; B64C 2201/185
See application file for complete search history.

(56) References Cited

U.S. PATENT DOCUMENTS

| 3,032,303 A | * | 5/1962 | Hatfield | ................. B64D 17/52 244/149 |
| 4,898,346 A | * | 2/1990 | Ertler | ..................... B64D 17/40 244/148 |
| 10,071,809 B2 | * | 9/2018 | English | ................. B64D 17/62 |

FOREIGN PATENT DOCUMENTS

| CH | 149873 A | 9/1931 |
| DE | 1073317 B | 1/1960 |
| EP | 2404827 A2 | 1/2012 |

OTHER PUBLICATIONS

International Search Report dated Apr. 29, 2019, issued in corresponding International Application No. PCT/EP2019/054712, filed Feb. 26, 2019, 6 pages.

(Continued)

*Primary Examiner* — Justin M Benedik
(74) *Attorney, Agent, or Firm* — Christensen O'Connor Johnson Kindness PLLC

(57) ABSTRACT

A device for unlocking a system for closing a container by means of a tie, such as a rope or strap, in particular a tie tensioned between closing eyelets, includes a cutting tool (O) capable of cutting the tie in order to unlock the closing system. It also includes an actuation member linked to the cutting tool, the actuation member being capable of being manipulated manually by a user in order to cause the cutting tool (O) to move into a position for severing the tie.

11 Claims, 4 Drawing Sheets

(51) Int. Cl.
     *B64D 17/38*      (2006.01)
     *B64D 17/64*      (2006.01)

(56) References Cited

OTHER PUBLICATIONS

Written Opinion dated Apr. 29, 2019, issued in corresponding International Application No. PCT/EP2019/054712, filed Feb. 26, 2019, 6 pages.

* cited by examiner

DEVICE FOR UNLOCKING A SYSTEM FOR CLOSING A CONTAINER BY MEANS OF A TIE AND CONTAINER PROVIDED WITH SUCH AN UNLOCKING DEVICE

The present invention relates, in general, to a device for unlocking a system for closing a container closed by means of a tie, such as a rope or strap, tensioned between closing eyelets.

In one application of the invention, the invention relates in particular to a device for unlocking a system for closing a parachute container.

However, the invention is not limited to a device for locking a system for closing a parachute, such that it does not depart from the scope of the invention when the unlocking device acts on a closing system used in other applications, such as, for example, in the field of water sports.

In the field of skydiving, a parachute is traditionally placed in the folded state in a container including flaps each provided with at least one eyelet and closed by means of a tie, also designated by the term of loop, which travels between the eyelets and which includes an end loop accessible from the outside of the container and wherein is inserted a closing pin, also designated by the term needle, in order to lock the flaps in closed position.

The tension exerted by the loop on the closing pin is a function of the adjustment of a length of the loop, of a volume of the compacted parachute in the container and, optionally, of a thrust exerted by a spring of an extractor device placed in the container between the compacted parachute and the flaps of the container.

The length of the loop may be easily pre-adjusted. By contrast, the volume of the compacted parachute as well as the thrust of the extractor device are variable and depend on various parameters, such as the temperature, hygrometry, distribution of the volume according to the dexterity of a person having folded the parachute, the time from the last folding of the parachute, etc.

Consequently, it is not possible to provide an ideal adjustment of the length of the loop so as to obtain a controlled tension of the loop and, consequently, an actuation force on an opening handle also controlled.

An ideal adjustment of the length of the loop is therefore not repeatable and not sustainable throughout the entire duration of folding of a parachute, the folding periodicities being in the order of one year.

Yet, a closing loop adjusted too long induces risks of unexpected disengagement of the pin due to lack of tension and, consequently, risks of untimely opening of the parachute container.

On the contrary, a too short loop risks generating too high actuation forces of the opening handle.

Moreover, when an extractor device is used, it is generally desired to design the extractors so as to have increasingly powerful springs so that same make it possible to propel the parachute beyond a low pressure area generated during the fall of a skydiver equipped with a parachute.

Yet, an increase of the power of the spring is accompanied with an increase of the tension of the closing loop and a consequent increase of the actuation force of the opening handle.

Therefore, the aim of the invention is to overcome said various drawbacks and propose a device for unlocking a closing system of a container by means of a tie that facilitates the unlocking of the closing system, even when the tension of the tie increases.

Another aim of the invention is to propose a device for unlocking a system for closing a parachute container with manual control that facilitates the extraction of the parachute even when the tension exerting on the closing loop increases.

Therefore, the aim of the invention is, according to a first aspect, a device for unlocking a system for closing a container by means of a tie, such as a rope or strap, in particular a tie tensioned between eyelets comprising a cutting tool capable of cutting the tie in order to unlock the closing system.

Said unlocking system includes an actuation member linked to the cutting tool, the actuation member being capable of being manipulated manually by a user in order to cause the cutting tool to move into a position for severing said tie.

Thus, thanks to the use of a cutting tool for cutting the tie of the closing system, it is noted that the force to be applied on the actuation member in order to unlock the closing system decreases when the tension of the tie increases.

Preferably, the unlocking system further comprises a connecting element between the actuation member and the cutting tool.

In one embodiment, the cutting tool comprises at least one blade, one blade holder and/or one moveable shuttle.

Preferably, the blade holder is mounted on the moveable shuttle.

Advantageously, the moveable shuttle is linked to the actuation member.

In one embodiment, the cutting tool comprises retaining means acting on the blade holder against a force exerted by the actuation member.

Preferably, the retaining means comprise a pusher comprising a ball that engages in a groove made in the moveable shuttle.

Advantageously, the pusher comprises a spring urging the ball into the groove.

The aim of the invention is also, according to a second aspect, a container comprising at least one flap deployable in open position of the container and likely to be folded down in closing position of the container, a system for closing the container comprising a tie, such as a rope or strap, in particular a tie tensioned between eyelets made in the flap having a first end linked to the container and an opposite end provided with an end loop, and a locking pin engaging in the end loop, said container including an unlocking device such as defined above.

Advantageously, the container further comprises an extractor device acting on the flap in order to urge same in deployed position.

In one embodiment, the locking device is mounted on the flap of the container, in the axis of an eyelet of the flap.

Finally, the aim of the invention is a container such as defined above, which constitutes a container for containing a parachute.

The present invention will be better understood and other aims, features and advantages of the invention will become apparent upon reading the following detailed description, comprising embodiments given for illustrative purposes with reference to the appended figures, presented by way of non-limiting example only, which may serve to complete the understanding of the present invention and the disclosure of the embodiment thereof and, if applicable, contribute to the definition thereof, and made with reference to the appended drawings, wherein.

It should be noted that, in the figures, the structural and/or functional elements common to the various embodiments may have the same references. Thus, unless mentioned otherwise, such elements comprise identical structural, dimensional and material properties.

Figure 1:
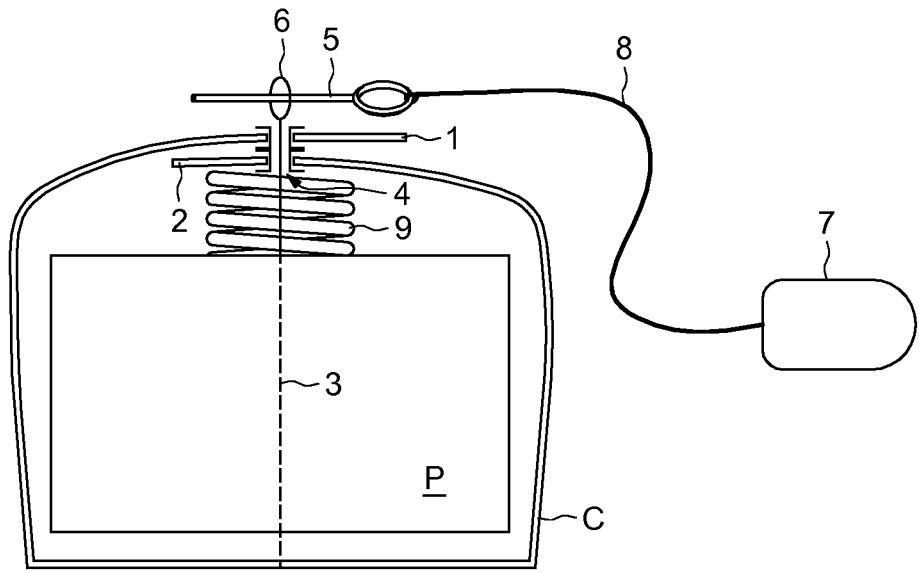
FIG. 1 is a schematic view of the parachute container according to prior art.

It is shown in FIG. 1 a schematic view of a parachute container according to prior art.

As shown in said figure, a container C wherein is stored a folded parachute P and that includes at least two flaps 1 and 2, at least partially superimposed when the container is closed and deployable in order to enable the extraction of the parachute P.

A loop 3 is fastened by one end of the container C and travels between the closing eyelets 4 of the flaps 1 and 2.

A closing pin 5 is inserted into an end 6 of the loop 3 in order to lock the container C in the closed state.

The closing pin 5 is connected to an opening handle 7 by means of a control cable 8.

In order to deploy the parachute, a pulling should be exerted on the opening handle 7 in order to release the closing pin 5 of the end loop 6 and thus trigger the opening of the container C by manual pulling.

In addition, an extractor device 9 is placed in the container C between the parachute P and the flaps 1 and 2 of the container C.

Figure 2:
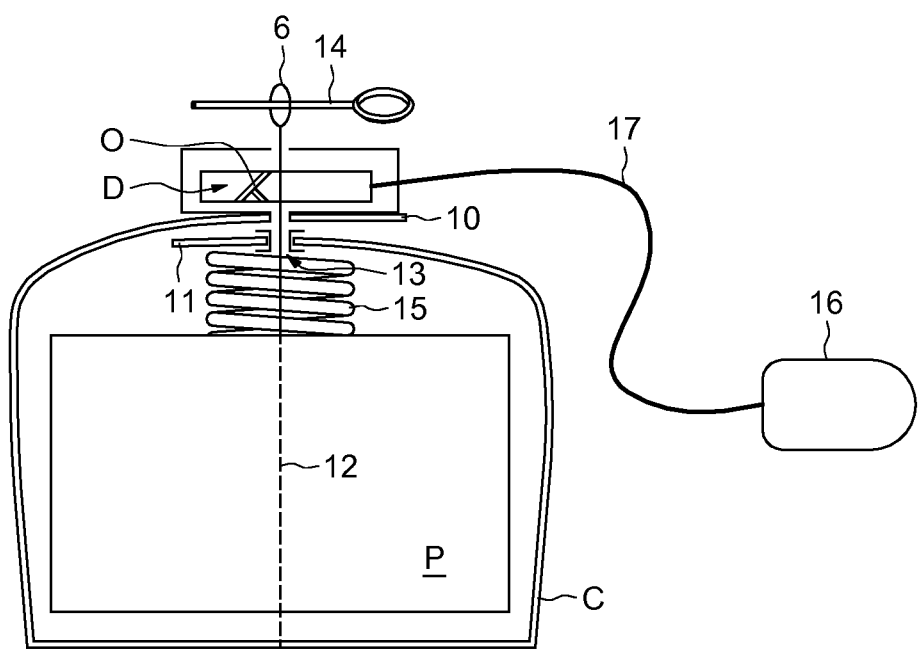
FIG. 2 is a schematic view of a parachute container according to the invention.

In FIG. 2, it is schematically shown a parachute container C according to the invention. In said figure, it is recognised a container C wherein is stored a folded parachute P and that includes at least two flaps 10 and 11, at least partially superimposed when the container is closed and likely to be deployed in order to enable the extraction of the parachute P stored in the folded state in the inner volume of the container C.

However, the present invention is not limited to the container C including at least two flaps 10 and 11. Indeed, it also finds an application with the container C including one flap 10 or 11.

A closing loop 12 is tensioned between eyelets 13 of the flaps 10 and 11. The number of eyelets 13 present on a flap 10 or 11 is not limited. According to a preferred embodiment, the flap 10, respectively the flap 11, includes an eyelet 13. However, it is perfectly possible that the flap 10, respectively the flap 11, includes a plurality of eyelets 13, particularly two eyelets 13.

In addition, the closing loop 12 is fastened by one of the ends thereof to the container C and comprising an opposite end in the form of an end loop 6, accessible from the outside of the container C, wherein is inserted a locking pin 14.

Moreover, the present invention also finds an application with the container C including flaps 10 and 11 devoid of eyelets 13 but held closed by means of the closing loop 12.

In the embodiment visible in FIG. 2, the container C includes internally an extractor device 15, here a spring-extractor device, shown schematically by a spring, placed in the container C between the folded parachute P and the flaps 10 and 11 of the container C. The extractor device 15 is optional.

Such an extractor device 15 includes, for example, a small-sized canopy system, particularly hemispherical, intended to be propelled by the spring of the extractor device 15 outside of the container C, during the opening thereof, in order to extract the parachute P to which same is linked.

The container C is moreover provided with a device D for unlocking a system for closing the container C.

The unlocking system, also schematically shown in FIG. 2, is, for example, fastened to an outer face of a flap 10, in particular an upper flap 10, or integrated into said flap 10. Preferably, the unlocking system is centred along the axis of the eyelet 13 made in the flap 10, which is generally combined with the extension axis of the closing loop 12. The unlocking device comprises a cutting tool O. According to one specific example of embodiment, the cutting tool O is linked to an actuation member 16, consisting, for example, of an opening handle 16 capable of being manipulated manually by a sky diver, in order to cause the closing system of the container to unlock.

In the embodiment illustrated, the actuation member 16 is linked to the cutting tool O by a flexible connecting element 17, such as a control cable.

The cutting tool O is moveable in relation to the closing loop 12 by the opening handle 16 between a resting position, wherein same is offset from the closing loop 12 and an active position wherein same is capable of severing the closing loop 12.

The unlocking system is mounted on the flap 10, along the path of the closing loop 12, between the flap 10 and the end loop 6 wherein is inserted the locking pin 14, such that an action on the actuation member 16 causes the closing loop 12 to sever below the locking point of the locking pin 14.

The opening of the container C is thus performed by acting on the actuation member 16, for example consisting of the opening handle, instead of an action on the locking pin 14.

Consequently, the forces applied by the closing loop 12 on the locking pin 14 do not generate any effect on the force required for causing the container C to open.

On the contrary, the pulling force to be exerted on the actuation member 16 is no longer correlated with the tension of the closing loop 12 that is exerted on the locking pin 14.

Figure 3:
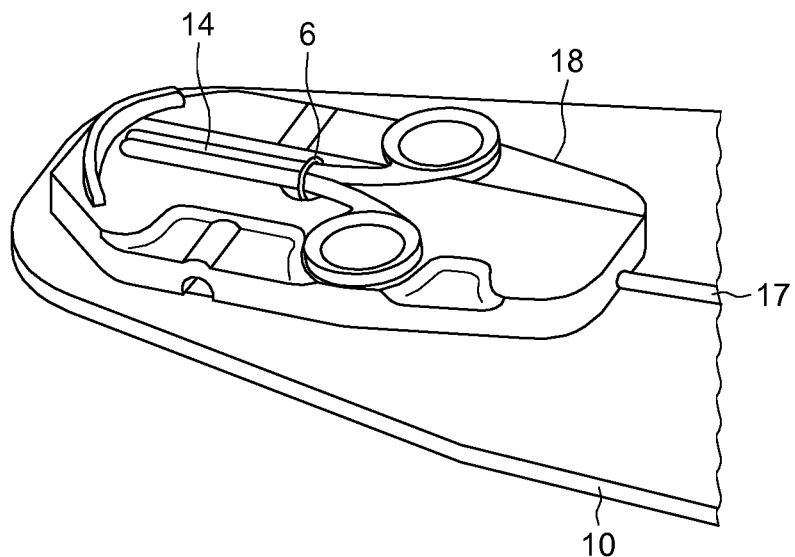
FIGS. 3 and 4 are perspective views, respectively of top and of bottom, of a portion of a system for closing the container, showing a closing loop and a closing pin inserted into the loop.
Figure 4:
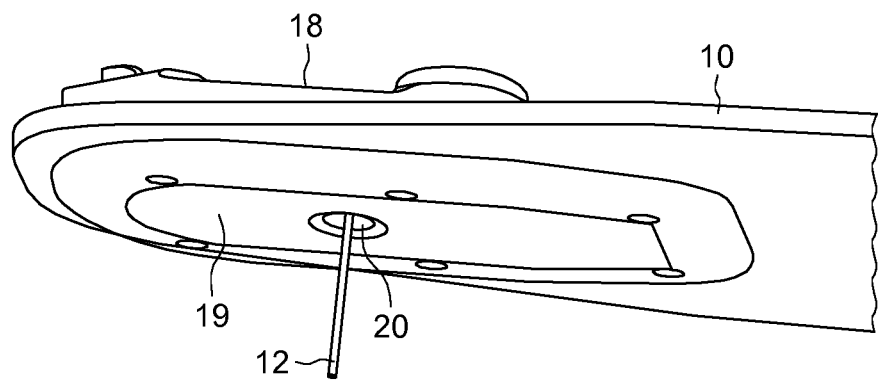

With reference to FIGS. 3 and 4, the unlocking system constitutes a severing box comprising an outer envelope 18 and a support plate 19 fastened one on the other on either side of the flap 10 whereon the unlocking system is mounted. It includes a passage 20 for the closing loop 12 wherein engages the locking pin 14.

Figure 5:
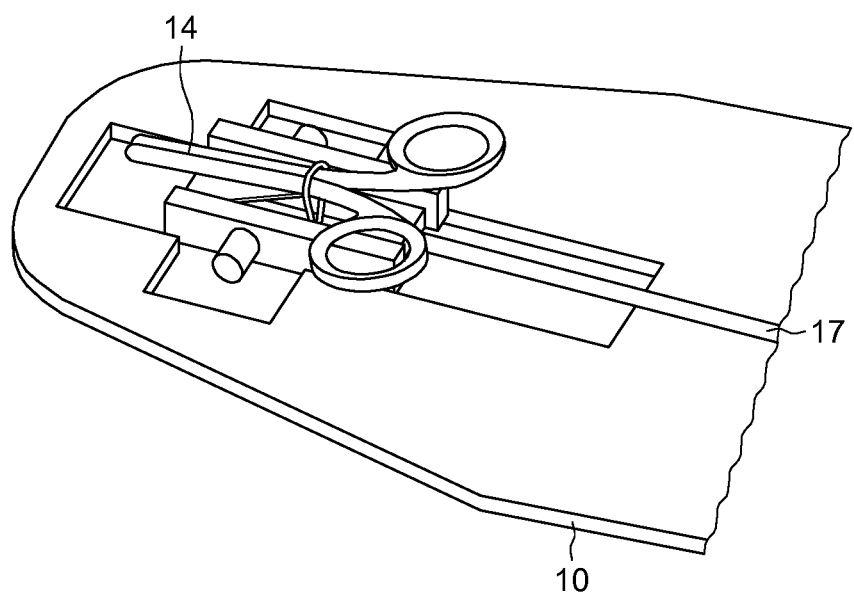
FIG. 5 shows the interior of the system for closing the container visible on FIGS. 3 and 4.
Figure 6:
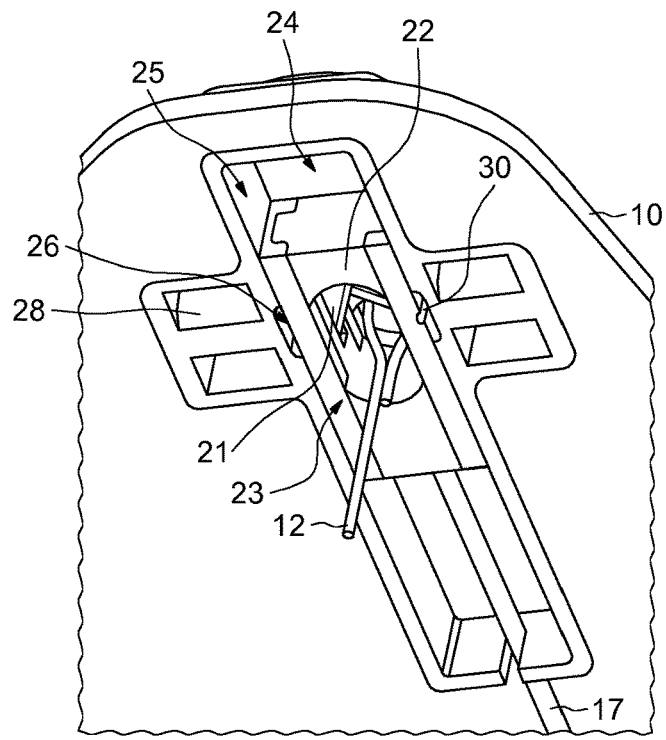
FIGS. 6 and 7 are bottom views of the interior of the system for closing the container, respectively before severing of a tie and after pulling on an actuation member and severing of the tie.
Figure 7:
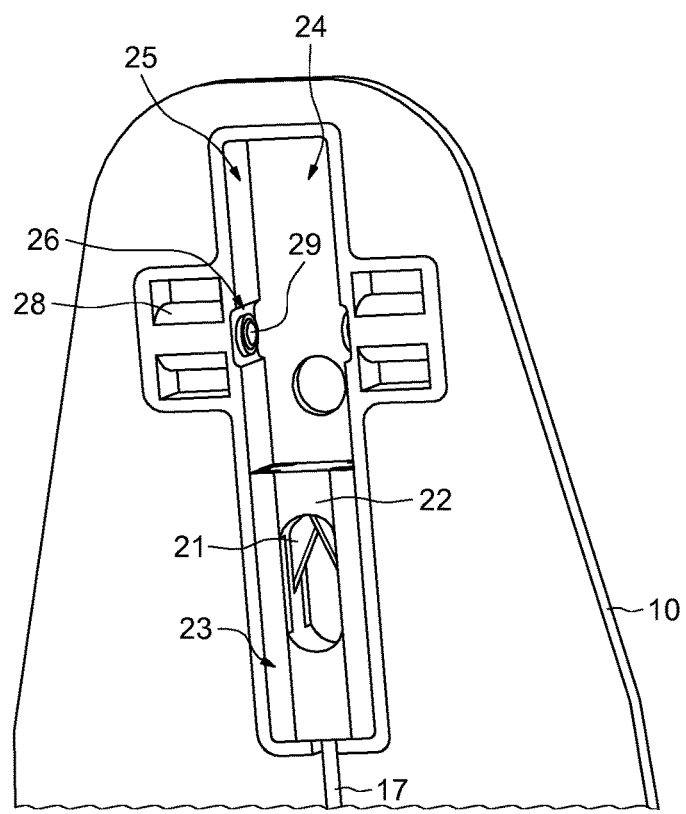

With reference to FIG. 5, which shows the severing box, outer envelope 18 removed, and to FIGS. 6 and 7 that show the severing box, support plate 19 removed, the unlocking system includes the cutting tool O comprising one or more blades 21. Advantageously, the blades 21 are mounted on a blade holder 22, same preferably mounted on a moveable shuttle 23, ideally connected to the actuation member 16, in particular via the control cable 17. It will be noted that the control cable 17 is optional so that the actuation member 16 may be directly linked to the moveable shuttle 23.

Moreover, it will be noted that the blade holder 22 is also optional so that it may be directly integrated into the moveable shuttle 23, by mounting the blade or blades 21 of the cutting tool O directly on the moveable shuttle 23.

According to the example of embodiment shown, the severing box may moreover include a body 24 delimiting two longitudinal slides 25. The slides 25 make it possible to provide a sliding of the moveable shuttle 23 by the actuation member 16 between a standby position wherein the cutting tool O is offset from the closing loop 12 (such as visible in FIG. 6) and an active position for severing the closing loop 12 (such as visible in FIG. 7).

In addition, it is moreover seen in FIGS. 6 and 7 that the body 24 of the severing box may be provided with retaining means 26, acting on the moveable shuttle 23, such as to calibrate the force required to cause the moveable shuttle 23 to move.

In the example of embodiment illustrated, the retaining means 26 include one or more pushers, here two in number, arranged on either side of the moveable shuttle in the resting position thereof.

The pushers include, for example, a spring mounted in a cage 28, advantageously a cylindrical cage 28, acting on a ball 29, mounted protruding in one of the slides 25, so as to engage in a groove 30 made laterally in the moveable shuttle 23. It is thus possible to adjust the actuation force of the moveable shuttle 23 by acting, either on the force of the spring, or on the depth, or generally on the size, of the lateral groove 30.

Furthermore, it is avoided any risk of untimely movement of the moveable shuttle 23 that would risk causing a consecutive severing of the closing loop 12.

The force to be applied on the actuation member 16 in order to sever the closing loop 12 thus corresponds to an accumulation of friction forces of the moveable shuttle 23 of the cutting tool O in the severing box and resistance forces to the severance of the closing loop 12. The greater the tension of the closing loop 12, the lower the resistance forces to the severance of the closing loop 12.

It is therefore possible to find an adjustment of the length of the closing loop 12 generating a tension that is strong enough to provide a constant holding of the locking pin and to absorb the variances of volume of the folded parachute P and of thrust of the extractor device 15 acting on the flaps 10 and 11 of the container C whilst maintaining actuation forces of the actuation member 16 constants because same only depend on the friction forces related to the severance box.

Finally, it will be noted that the present invention results from a contract concluded by the Ministry of Defence—General Delegation for Armament, which comprises certain rights thereon.

Obviously, the invention is not limited to the embodiments described previously and provided only by way of example. It encompasses various modifications, alternative forms and other variants that may be envisaged by the person skilled in the art within the scope of the present invention and particularly any combinations of the various operating modes described previously, that may be taken separately or in combination.

The invention claimed is:

1. An unlocking device for unlocking a closing system for closing a container by a tie, comprising:
    a cutting tool capable of cutting the tie in order to unlock the closing system, wherein the cutting tool comprises a blade holder and a movable shuttle; and
    an actuation member linked to the cutting tool, the actuation member being capable of being manipulated manually by a user in order to cause the cutting tool to move into a position for cutting the tie,
    wherein the cutting tool comprises retaining means acting on the blade holder against a force exerted by the actuation member, and
    wherein the retaining means comprise a pusher comprising a ball that engages in a groove made in the mobile shuttle.

2. The unlocking device according to claim 1, further comprising a connecting element disposed between the actuation member and the cutting tool.

3. The unlocking device according to claim 1, wherein the blade holder is mounted on the moveable shuttle.

4. The unlocking device according to claim 3, wherein the moveable shuttle is linked to the actuation member.

5. The unlocking device according to claim 3, wherein the moveable shuttle is linked to the actuation member.

6. The unlocking device according to claim 1, wherein the pusher comprises a spring urging the ball into the groove.

7. A container comprising:
    at least one flap deployable in an open position of the container and configured to be folded down in a closing position of the container;
    a system for closing the container comprising a tie having a first end linked to the container and an opposite end provided with an end loop, and a locking pin engaging in the end loop; and
    the unlocking device according to claim 1.

8. The container according to claim 7, further comprising an extractor device acting on the flap in order to urge the flap in the open position.

9. The container according to claim 8, wherein the locking device is mounted on the flap of the container, in an axis of an eyelet of the flap.

10. The container according to claim 7, wherein the locking device is mounted on the flap of the container, in an axis of an eyelet of the flap.

11. The container according to claim 7, wherein the container is a parachute container.

* * * * *